US012314793B2

(12) United States Patent
Wolfe et al.

(10) Patent No.: US 12,314,793 B2
(45) Date of Patent: *May 27, 2025

(54) COMPUTER-BASED SYSTEMS HAVING COMPUTING DEVICES CONFIGURED TO INTERACT WITH DYNAMIC CARDS AND METHODS OF USE THEREOF

(71) Applicant: American Express Travel Related Services Company, Inc., New York, NY (US)

(72) Inventors: Russell Wolfe, Phoenix, AZ (US); James Bruce Coleman, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 343 days.

This patent is subject to a terminal disclaimer.

(21) Appl. No.: 17/695,459

(22) Filed: Mar. 15, 2022

(65) Prior Publication Data

US 2022/0207312 A1 Jun. 30, 2022

Related U.S. Application Data

(63) Continuation of application No. 16/730,958, filed on Dec. 30, 2019, now Pat. No. 11,315,000.

(51) Int. Cl.
*G06K 19/07* (2006.01)

(52) U.S. Cl.
CPC ..... *G06K 19/0708* (2013.01); *G06K 19/0723* (2013.01)

(58) Field of Classification Search
CPC .......... G06K 19/0708; G06K 19/0723; G06Q 20/204; G06Q 20/341; G06Q 20/352; G06Q 20/3552

See application file for complete search history.

(56) References Cited

U.S. PATENT DOCUMENTS

| 8,201,747 | B2 | 6/2012 | Brown et al. |
| 9,373,069 | B2 | 6/2016 | Cloutier et al. |
| 10,713,649 | B1 | 7/2020 | Rule et al. |
| 11,315,000 | B1 * | 4/2022 | Wolfe .................. G06Q 20/353 |

(Continued)

*Primary Examiner* — Christle I Marshall
(74) *Attorney, Agent, or Firm* — Sterne, Kessler, Goldstein & Fox, P.L.L.C.

(57) ABSTRACT

At least some embodiments are directed to a dynamic card. The dynamic card transmits a first temporary card identification number to a computing device. The dynamic card is without an internal power source and is powered up by an external power source housed within the computing device. The dynamic card determines an absence of unused encrypted card identification numbers and receives a set of encrypted card identification numbers from a server. The dynamic card decrypts a second temporary card identification number from the encrypted card identification numbers and shows the second temporary card identification number on a display, replacing the first temporary card identification number. The second temporary card identification number remains shown on the display after the power from the external power source is discontinued. The second temporary card identification number can be used in a subsequent interaction with another computing device.

20 Claims, 8 Drawing Sheets

(56) References Cited

U.S. PATENT DOCUMENTS

2009/0048971 A1  2/2009  Hathaway et al.
2009/0159709 A1  6/2009  Mullen
2015/0302413 A1  10/2015  Dua
2016/0189123 A1  6/2016  Specogna et al.
2016/0189127 A1  6/2016  Amarnath et al.
2019/0354986 A1  11/2019  Brimhall et al.
2021/0049439 A1  2/2021  Finn

* cited by examiner

COMPUTER-BASED SYSTEMS HAVING COMPUTING DEVICES CONFIGURED TO INTERACT WITH DYNAMIC CARDS AND METHODS OF USE THEREOF

BACKGROUND OF TECHNOLOGY

Smart card devices can connect to computing devices with direct physical contact or with a remote contactless radio frequency interface. Smart cards can store data and transmit such data to computing devices. Some smart cards include static data that can be used to complete an interaction with a computing device. Such smart cards can be tampered with when a third-party uses the static data to complete interactions with computing devices unbeknown to a legitimate user of a smart card.

SUMMARY OF DESCRIBED SUBJECT MATTER

In some embodiments, the present disclosure provides a technically improved computer-based apparatus that includes at least the following computer-based dynamic card. A dynamic card comprising: a processor; a display; and a non-transitory memory storing instructions; where the dynamic card is configured to power up upon receiving a power from an external power source housed within a computing device; where the dynamic card is without an internal power source; where the instructions, when executed by the processor, cause the processor to: cause to transmit a first temporary card identification number associated with the dynamic card to the computing device; receive at least one encrypted card identification number from at least one server in communication with the computing device when a condition is met; decrypt a second temporary card identification number from the at least one encrypted card identification number; and replace the first temporary card identification number shown on the display with the second temporary card identification number, and where the second temporary card identification number remains shown on the display after the power from the external power source is discontinued.

In some embodiments, the present disclosure provides a technically improved computer-based method comprising: powering up a dynamic card, upon receiving a power from an external power source housed within a computing device; wherein the dynamic card is without an internal power source; and where, when the dynamic card is powered up: transmitting, by the processor, a first temporary card identification number associated with the dynamic card to the computing device; receiving, by the processor, at least one encrypted card identification number from at least one server in communication with the computing device when a condition is met; decrypting, by the processor, a second temporary card identification number from the at least one encrypted card identification number; and replacing, by the processor, the first temporary card identification number shown on a display with the second temporary card identification number, and where the second temporary card identification number remains shown on the display after the power from the external power source is discontinued.

In some embodiments, the present disclosure provides a technically improved computer-based article comprising: a non-transitory computer readable medium comprising code which, when executed by a processor, causes the processor to: power up a dynamic card upon receiving a power from an external power source housed within a computing device; where the dynamic card is without an internal power source; and where, when the dynamic card is powered up, the instructions further cause the processor to: transmit a first temporary card identification number associated with the dynamic card to the computing device; receive at least one encrypted card identification number from at least one server in communication with the computing device when a condition is met; decrypt a second temporary card identification number from the at least one encrypted card identification number; and replace the first temporary card identification number shown on a display with the second temporary card identification number, and where the second temporary card identification number remains shown on the display after the power from the external power source is discontinued.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art one or more illustrative embodiments.

DETAILED DESCRIPTION

Figure 1:
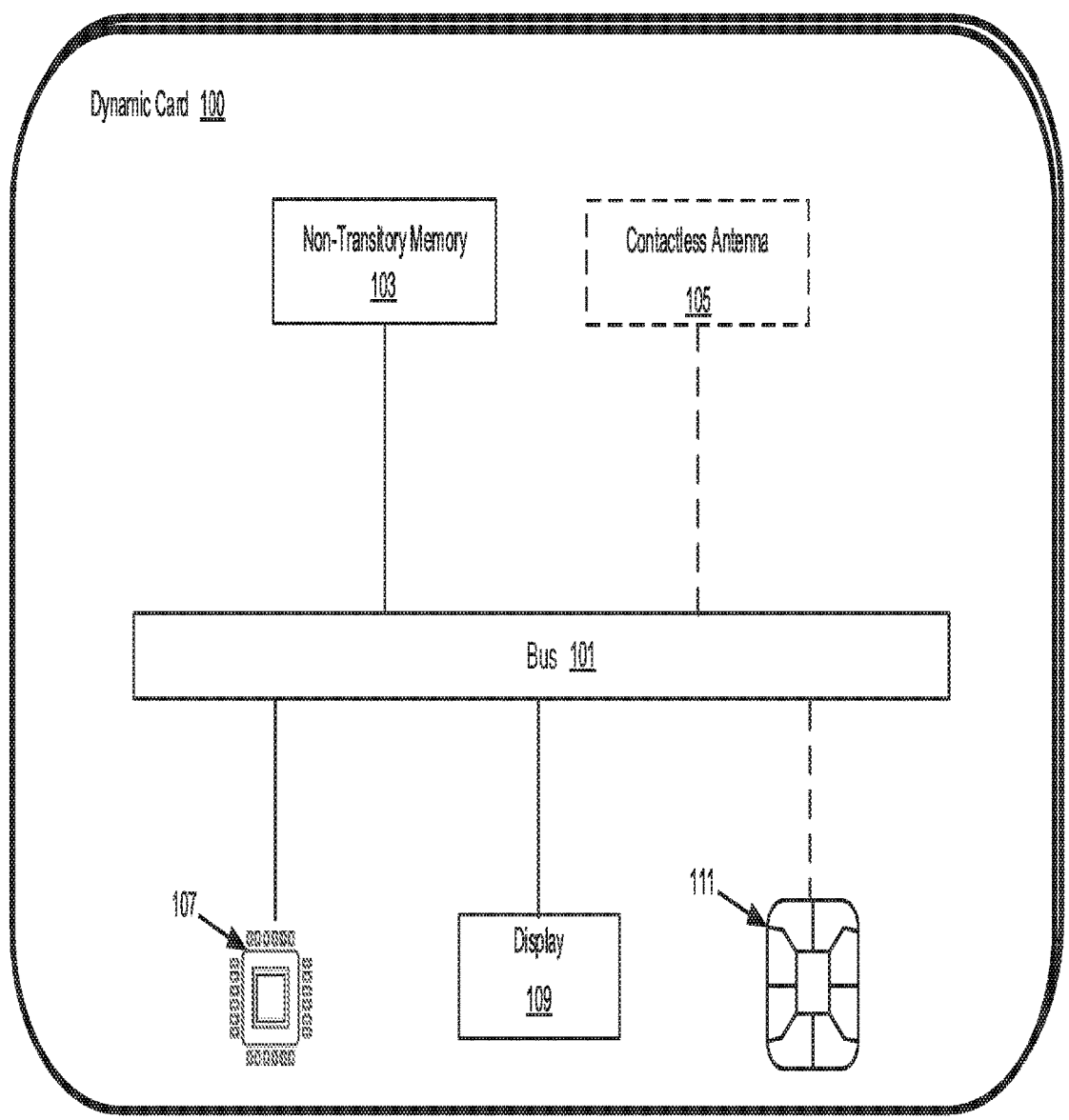
FIGS. 1-8 show one or more schematic flow diagrams, certain computer-based architectures, and/or implementations which are illustrative of some examples of aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

FIGS. 1 through 8 illustrate apparatus and methods for dynamic cards. The following embodiments provide technical solutions and/or technical improvements that overcome security technical problems, drawbacks and/or deficiencies in the technical field of cards. As explained in more detail, below, technical solutions and/or technical improvements herein include aspects of improved cards resilient to fraudulent use. Moreover, various practical applications of the disclosed technology are also described, which provide further practical benefits to users and operators that are also new and useful improvements in the art.

As used herein, the term "card" can refer to an electronic card with at least one embedded microprocessor. In some embodiments, a card can be contact-based or a contactless card. A contact-based card can include an integrated circuit chip and/or other physical or electrical terminals that allows the card to communicate with a computing device. In some embodiments, the card can be a contactless or dual interface ("DI") card that may additionally communicate from a distance with a computing device through radio frequency identification (RFID) technology, near field communication (NFC) technology, or other type of radio waves or signals. For example, when held at a predetermined distance from a computing device, a contactless card may be configured to use one or more antennas to transmit data stored in the card and receive data from a computing device.

In some embodiments, the card may be dimensioned and/or be utilized such as, but not limited to, a conventional credit or debit card issued to account holders by banks and other financial institutions. In some embodiments, the card may be dimensioned and/or be utilized such as, but not limited to, personal identification cards, health entitlement cards, store loyalty cards, stored value cards (electronic purses), information storage cards, and the like. In some embodiments, the card may be dimensioned, but not limited to, in accordance with international standard ISO/IEC 7810, ID-1 format, which specifies dimensions of 85.60 mm (85.60×10-3 m) long by 53.98 mm (53.98×10-3 m) wide. In some embodiments, the card may be dimensioned, but not limited to, in accordance with international standard ISO/IEC 7813 which further specifies the thickness as 0.76 mm (0.76×10-3 m). For example, the card may be made of a plastic material, metal or similar material, and may have convenient overall dimensions of 7.5 cm by 11 cm by 1 cm similar to a common wallet.

As used herein, the term "dynamic card" can refer to the card that has been technologically improved to operate in accordance with the present disclosure.

As used herein, the term "computing device" can refer to any electronic device that can receive, transmit, and/or process data stored in the dynamic card. In some embodiments, a computing device can include a power source that may be able to power up the dynamic card and receive data from a server.

As used herein a "point of sale (POS)" terminal can refer to the computing device implemented with a combination of hardware and software and can include a contact-based and/or a contactless card-reader device. In some embodiments, the contact-based card-reader device can communicate with the dynamic card via an integrated circuit chip and/or other physical or electrical terminals embedded in the dynamic card. In some embodiments, a contactless card-reader device can use RFID technology, NFC technology, or other type of radio waves or signals to communicate with the dynamic card. In some embodiments, a "transaction event" between the dynamic card and the computing device, such as a POS terminal, may include a contact-based transaction or a contactless transaction event. Non-limiting example of a POS terminal can include Shopkeep®, Lightspeed®, Touchbistro®, Upserve®, Toast®, Springboardretail®, Vend® or other suitable types of technologies.

As used herein, a "power" can refer a rate at which energy is transferred to and from a part of an electric circuit. For example, the power can be transferred by supplying AC or DC electrical charge in a contact-based interaction. For example, the power can be transferred inductively, by generating, but not limited to, time-varying electromagnetic field during a contactless interaction between a transmitting device and a receiving device that converts the received power to DC or AC electric charge to be used by the electric circuit hosted by the receiving device.

As used herein a "power source" can refer to a suitable source of supplying the power. For example, the power source is a source of AC or DC power supplied during the contact-based interaction and can be functionally equivalent to plugging into a wall power source or charging from another device such as a desktop or laptop computer. For example, the power source is a source of AC or DC power combined with a transmitting device that generates, but is not limited to, time-varying electromagnetic field during a contactless interaction between the transmitting device having a transmitting antenna and a receiving device having a receiving antenna.

As used herein an "external power source" is the power source supplying the power to the card but which resides separately from the dynamic card. For example, as disclosed herein, a POS terminal can be the external power source. In some embodiments, the external power source can supply electrical charge via a contact-based interaction between electrical terminals of the dynamic card and electrical terminals of the external power source. In some embodiments, the external power source can supply, additionally or alternatively, electrical charge via a contactless interaction between the dynamic card and the external power source.

As used herein an "internal power source" is the power source that is not the external power source. In some embodiments, the internal power source resides within the dynamic card and can include, but not limited to, a primary battery, a rechargeable battery, or an alternative power source. For example, an alternative power source, or a combination of alternative power sources can be, but not limited to, a super capacitor, a solar cell, and/or a bioenergy power source.

As used herein a "permanent card identification number" can refer to, for example, a set of numbers used to identify a card issuer and a card holder.

As used herein a "temporary card identification number" can refer to, for example, a Card Verification Value (CVV), a Card Verification Code (CVC), a Card Identification Number (CID), or other suitable number associated with a card and that are not permanently shown on the card.

In some embodiments, a dynamic card can be used to accomplish different types of secure transactions including transactions via a computing device, contactless transactions, and e-commerce transactions, over the phone transactions, and other suitable types of transactions. Various embodiments are directed to the technical problem of unsecure or fraudulent transactions providing at least one technical solution that includes recurrently changing card identification numbers shown on a card display. For example, the showing of the permanent Card Verification Value (CVV), Card Verification Code (CVC), or Card Identification Number (CID) on the card facilitates fraudulent transactions. Instead, various embodiments of the present disclosure provide various technical solutions to such a technical problem by allowing dynamic cards of the present disclosure to display the temporary card identification number based on encrypted communications. In some embodiments, the temporary card identification number prevents fraudulent transactions by being a single-use number. In some embodiments, the temporary card identification number prevents fraudulent transactions by being a time-limited use number.

Various embodiments provide a technical solution by enabling the dynamic card to operate without an internal battery, powered up by an external power source, overcoming technical problems associated with battery overheating, battery short life time, battery underperformance in extreme temperatures, and other types of drawbacks associated with batteries contained in cards and other suitable devices.

FIG. 1 illustrates an example of an implementation of a dynamic card 100, in accordance with one or more embodiments of the present disclosure. In some embodiments, the dynamic card 100 can include a communication bus 101, a processor 107, a non-transitory memory 103, an output device interface such as, but not limited to, display 109, and at least one of: a contactless antenna 105 (in embodiments having the contactless interactions) an integrated circuit chip 111 (in embodiments having the contact-based interactions), or a combination of the contactless antenna 105 and the integrated circuit chip 111 (in embodiments having capability for the contactless and/or contact-based interactions).

In some embodiments, the communication bus 101 communicatively connects two or more internal devices of the dynamic card 100. For example, the communication bus 101 can be, for example, a physical interface for interconnecting the various components or internal devices.

In some embodiments, the dynamic card 100 may include a processor 107 configured to perform instructions upon receiving power from an external power source provided via the communication bus 101 by, e.g., the computing device not shown in FIG. 1.

In some embodiments, the non-transitory memory 103 may include any type of computer memory that retains data after the dynamic card 100 is powered off. For instance, the non-transitory memory 103 can store one or more encrypted card identification numbers with time stamps, where such card identification numbers include temporary card identification numbers that can be updated throughout multiple interactions between the dynamic card 100 and other computing devices as discussed below with reference to FIGS. 3-9.

In some embodiments, display 109 can be an electrophoretic display or other suitable display that retains an image even when all power sources are removed from the dynamic card generally or the display specifically. In some implementations, the display 109 may only consume power whenever the displayed image changes. The display 109 can display temporary card identification numbers retrieved and decrypted from a set of encrypted card identification numbers stored in the non-transitory memory 103.

In some embodiments, contactless antenna 105 can include a Radio Frequency Identification (RFID) system, a Near Field Communication (NFC) system or other suitable system that enables the dynamic card 100 to transmit data to other computing devices in a contactless interaction. In some implementations, the contactless antenna 105 can receive electromagnetic waves (e.g., by radio frequency induction) from a computing device, wherein such electromagnetic waves can power up the dynamic card 100. In some instances, the dynamic card 100 can be powered up via the contactless antenna 105 and thereafter retrieve and decrypt a temporary card identification number from the set of encrypted card identification numbers stored in the non-transitory memory 103. The dynamic card 100 can then show the temporary card identification number on the display 109 such that the number remains shown on the display after the contactless interaction has been terminated.

In some embodiments, the integrated circuit chip 111 can provide the dynamic card 100 with electrical connectivity to an external power source when inserted into a computing device. In some embodiments, the integrated chip may comply with the EMV standard published by EMVco. In some embodiments, the processor 107 can be embedded into the integrated circuit chip 111. In some instances, upon interaction with the computing device, the dynamic card 100 sends and receives information from the computing device and/or a server in communication with the computing device. In some instances, the dynamic card 100 receives a set of encrypted card identification numbers from the server in communication with the computing device or reader device.

In some instances, the display 109 displays a first temporary card identification number prior to the interaction between the dynamic card 100 and the computing device (e.g., POS terminal). After the dynamic card 100 is powered up upon the interaction with the computing device, instructions stored in the non-transitory memory 103 cause the processor 107 to receive and store in the non-transitory memory 103 one or more encrypted card identification numbers from at least one server in communication with the computing device, retrieve an encrypted card identification number from the non-transitory memory 103 and decrypt the encrypted card identification number to obtain a second temporary card identification number, and replace the first temporary card identification number with the second temporary card identification number on the display 109. For example, the instructions stored in the non-transitory memory 103 cause the processor 107 to decrypt the encrypted card identification number utilizing, without limitation, private/public key pair techniques, Triple Data Encryption Standard (3DES) techniques, block cipher algorithms (e.g., IDEA, RC2, RC5, CAST and Skipjack), and/or cryptographic hash algorithms (e.g., MD5, RIPEMD-160, RTRO, SHA-1, SHA-2, Tiger (TTH), WHIRLPOOL, RNGs).

Figure 2:
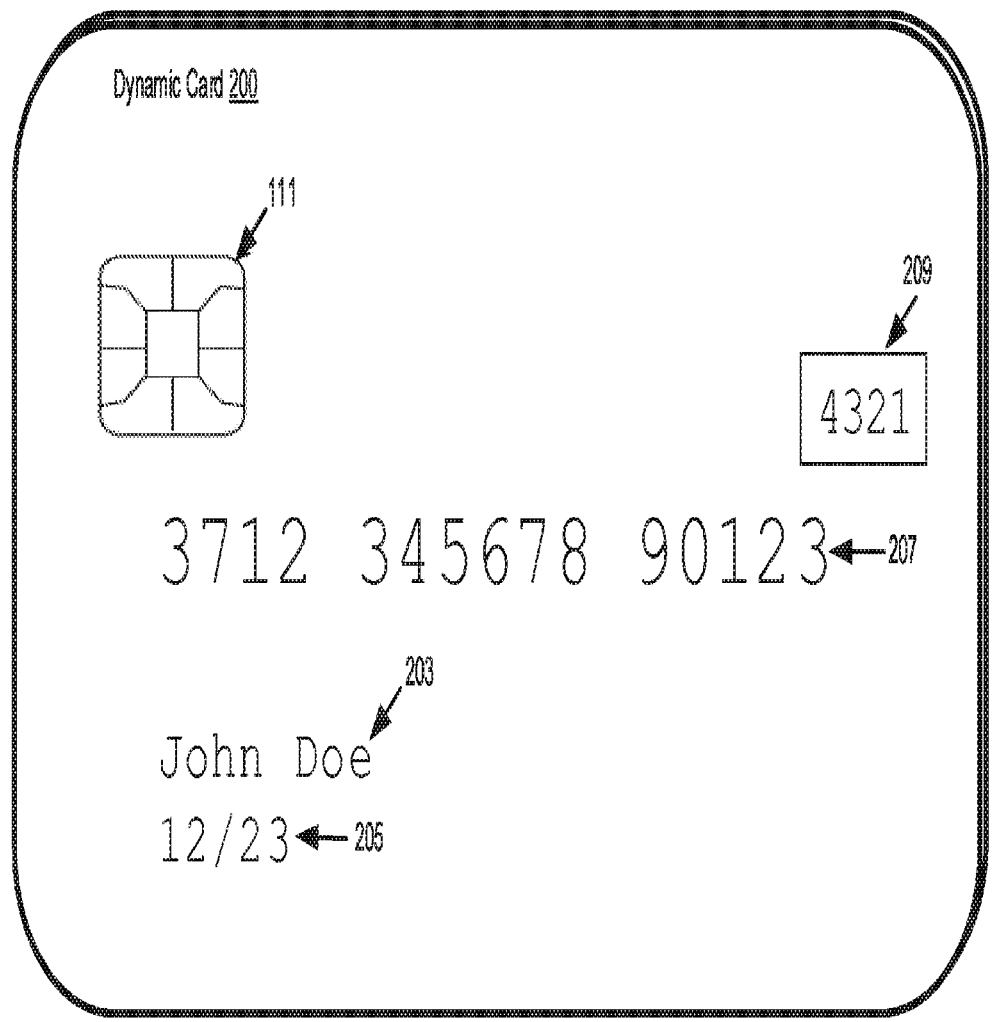

FIG. 2 illustrates an example of a dynamic card, in accordance with one or more embodiments of the present disclosure. In some implementations, the dynamic card 200 can be associated with a user. In this example, the user name may be engraved on the dynamic card as shown at 203. The dynamic card 200 can also include an expiration date as shown at 205. In some implementations, the dynamic card 200 can include a permanent card identification number as shown at 207 and a temporary card identification number shown on display 209. The permanent identification card number and/or the temporary identification card number can be associated with a credit card account. The user name 203 engraved or printed on the dynamic card may be responsible for or associated with such credit card account. In some instances, the permanent card identification number 207 can be used in conjunction with the temporary card identification number shown on display 209 to interact with a computing device. For example, the permanent card identification number 207 and the temporary card identification number shown on display 209 can be utilized to execute secured transactions, authenticate a card holder, or other suitable interactions with a computing device. For another example, the permanent card identification number can be used in an interaction with a computing device while the temporary card number is updated or changed by the computing device. In some instances, one or more of the information shown at 203, 205, 207, and 209 can be transmitted to a computing device via the integrated circuit 111 or via the contactless antenna 105 discussed with reference to FIG. 1.

Figure 3:
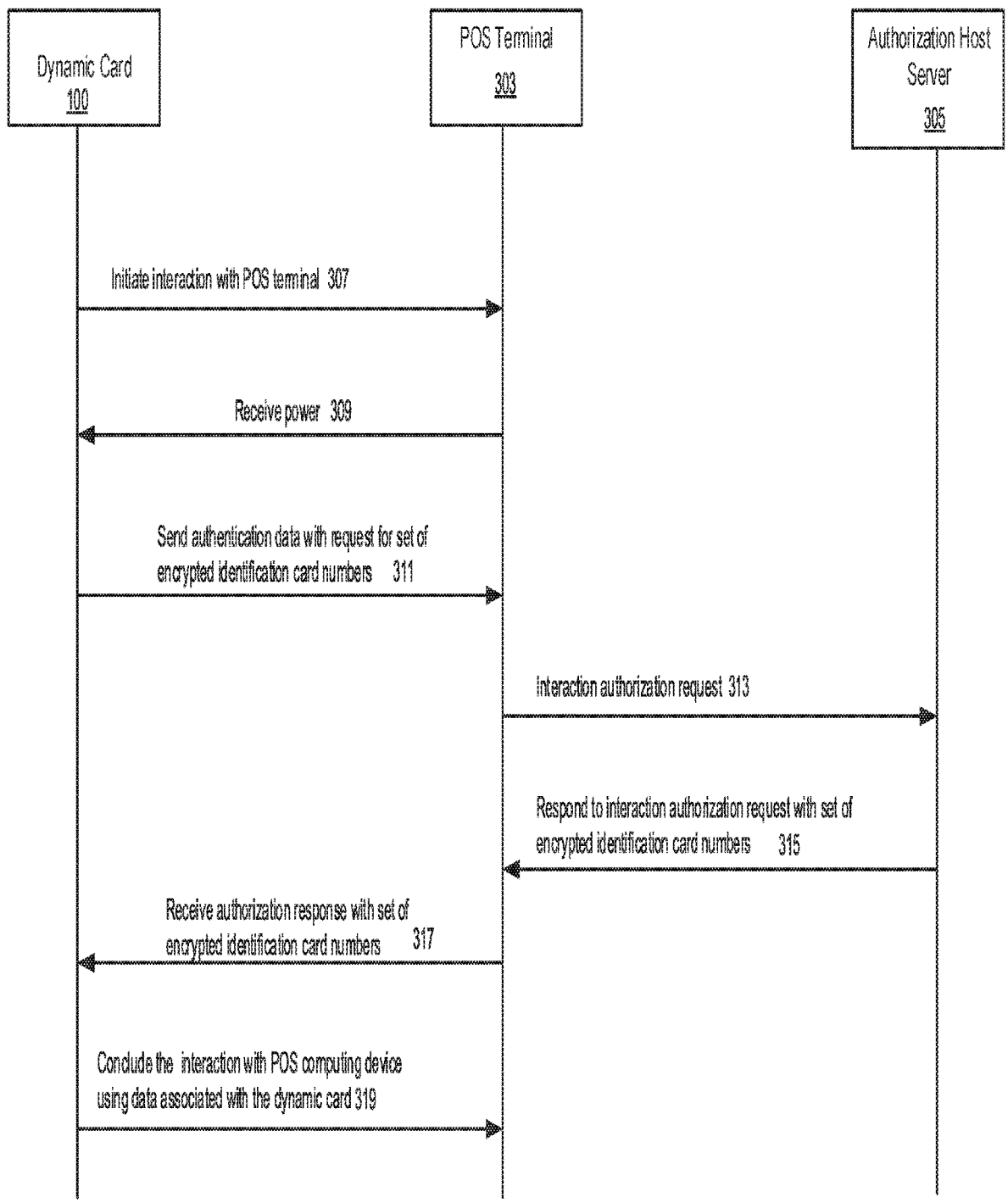

FIG. 3 illustrates a swim lane diagram illustrating examples of computations executed by the dynamic card, in accordance with one or more embodiments of the present disclosure. The swim lane diagram shown in FIG. 3 includes operations of the dynamic card 100, a computing device such as a point of sale (POS) terminal 303, and an authorization host server 305. A POS terminal 303 is a computing device that can include a card-reader device and be implemented with a combination of hardware and software enabling retail locations to accept card payments. A POS terminal can read information from a dynamic card 100 via a card-reader device and, in combination with the authorization host server 305 and other systems as appropriate, verify whether the funds available to the user are sufficient for a transaction, transfer funds from a customer's account to a seller's account, and/or record the transaction in the customer and seller accounts. In some instances, the dynamic card can initiate an interaction with the POS terminal 303. As discussed above, in some instances, the initiation of the interaction can include inserting the dynamic card 100 into the POS terminal for the contact-based interaction. As discussed above, in some instances, the initiation of the interaction can include moving the dynamic card 100 near or proximate to the POS terminal so that the receiving antenna 105 of the dynamic card 100 can receive the power from a transmitting antenna of the POS terminal and is subject to electromagnetic field such that the interaction can be a contactless interaction. At 309, the dynamic card 100 receives power (e.g., electrical charge, electromagnetic waves) from an external power source, in this case from the POS terminal 303.

In some embodiments, the dynamic card 100 may determine whether encrypted card identification numbers should be obtained based on the satisfaction of a condition. In some embodiments, the condition may be based on information that is available to the dynamic card 100 without retrieving additional information from other components of the system 800 described in FIG. 8. For instance, processor 107 may compare and determine whether the quantity of additional encrypted card identification numbers stored in non-transitory memory 103 exceeds a threshold. The threshold may be fixed (e.g., zero or another positive number less than 5) or dynamically determined (e.g., based on how frequently the dynamic card 100 was recently used to make purchases that require the use of a temporary card identification number). In addition, or alternatively, when dynamic card 100 is inserted in POS terminal 303, it may be provided with a signal from authorization host server 305 that encrypted card identification numbers should be obtained in addition to, or as a replacement for, the encrypted card identification numbers stored in non-transitory memory 103 (if any). In other embodiments, the condition may be based on information that is retrieved from devices external to the dynamic card 100, such as an indication from authorization host server 305 via POS terminal 303 to retrieve additional encrypted card identification numbers.

Thereafter, at 311 the dynamic card 100 can send authentication data with a request for a set of encrypted card identification numbers to the POS terminal 303. Such authentication data can include a name 203, expiration date 205, permanent identification number 207, and temporary card identification number rendered on the display 109 discussed with reference to FIG. 2 and/or other suitable authentication data or data computed by the dynamic card for the interaction with the POS terminal 303.

In some embodiments, at 313 the POS terminal 303 can send an interaction authorization request to the authorization host server 305. Such a request can be sent via the cloud or network discussed with reference to FIG. 8, or other suitable type of computing device communication system. In some instances, the interaction authorization request can include one or more of the data sent by the dynamic card 100 to the POS terminal 303 including a request for a set of encrypted card identification numbers.

In some embodiments, the authorization host server 305 can, in real-time, authenticate the dynamic card 100 and produce a set of encrypted card identification numbers. Accordingly, the authorization host server 305 can authorize the interaction and respond to the interaction authorization request with a set of encrypted card identification numbers as shown at 315. Such a set of encrypted card identification numbers can be preapproved by the authorization host server for a user, such that, the user can utilize decrypted card identification numbers from the set of encrypted card identification numbers in electronic transactions, for example, e-commerce transactions, transactions made through a POS terminal, or other suitable transactions. Thereafter, the dynamic card 100 can receive the authorization response with the set of encrypted identification numbers from, for example, the POS terminal 303 as shown at 317. The dynamic card 100 can then store the set of encrypted identification numbers in the non-transitory memory 103, select, and decrypt an identification number from the set of encrypted identification numbers to produce a new temporary card identification number. As discussed above, the dynamic card 100 can show the new temporary card identification number on the display 109 while the dynamic card 100 is being powered up by the POS terminal 303. Thereafter, at 319 the dynamic card 100 can conclude the interaction with the POS terminal 303 using data associated with the dynamic card 100. The new temporary card identification number can remain shown on the display 109 and be utilized in a second interaction with for example, a second computing device. For instance, the webpage of a merchant may prompt the user to enter the temporary card identification number shown on the display 109 when the user engages in a transaction, and the temporary card identification number may be used to authenticate the transaction.

Figure 4:
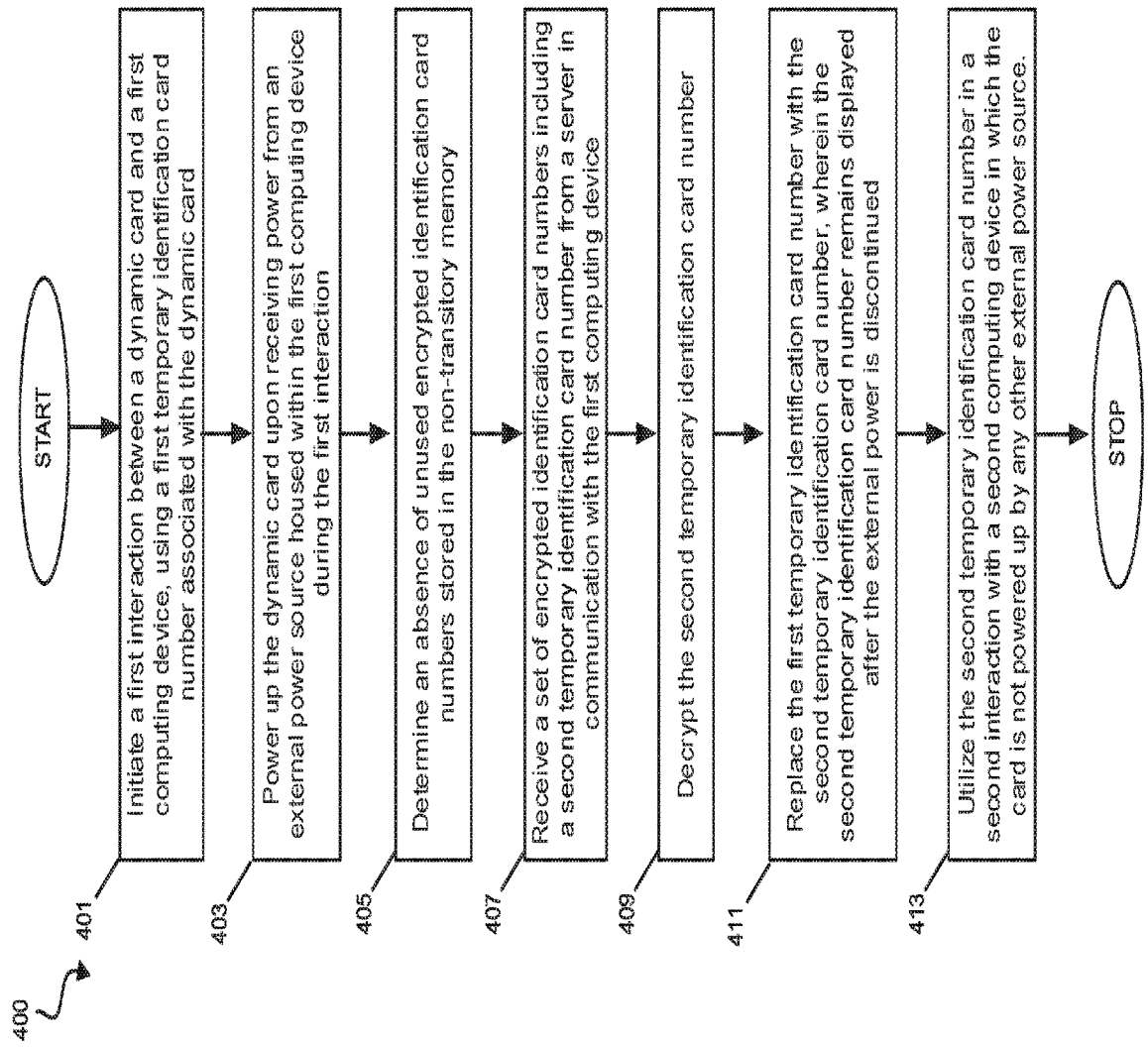

FIG. 4 is a flowchart illustrating examples of computations executed by the dynamic card 100, in accordance with one or more embodiments of the present disclosure. In some instances, the dynamic card 100 can initiate a first interaction with a computing device using, for example, a first temporary card identification number and a permanent card number associated with the card as shown at 401. As discussed above, the dynamic card 100 can power up from an external power source, for example using voltage from the computing device during the interaction as shown at 403. In some instances, the dynamic card 100 can determine an absence of unused encrypted card identification numbers as shown at 405.

In some embodiments, the dynamic card 100 can send a signal to an authorization server via the computing device to request a set of encrypted card identification number and in response to the request receive the set of encrypted card identification numbers as shown at 407. Thereafter, at 409 the dynamic card 100 can decrypt a second temporary card identification number selected from the set of encrypted card identification numbers. At 411, the dynamic card 100 can replace the first temporary card identification number with the second temporary card identification number. The dynamic card 100 renders on the display the second temporary card identification number. The second temporary card identification number can remain shown on the display after the first interaction with the computing device is terminated. In some instances, as shown at 413, the dynamic card 100 can use the second temporary card identification number in a second interaction with for example, a second computing device in which the card is not powered up by any other external power source, for example, in an e-commerce transaction where a user submits data associated with the dynamic card. Such data can include, for example, a permanent card identification number, the second temporary card identification number, user name, expiration date or other suitable data.

Figure 5:
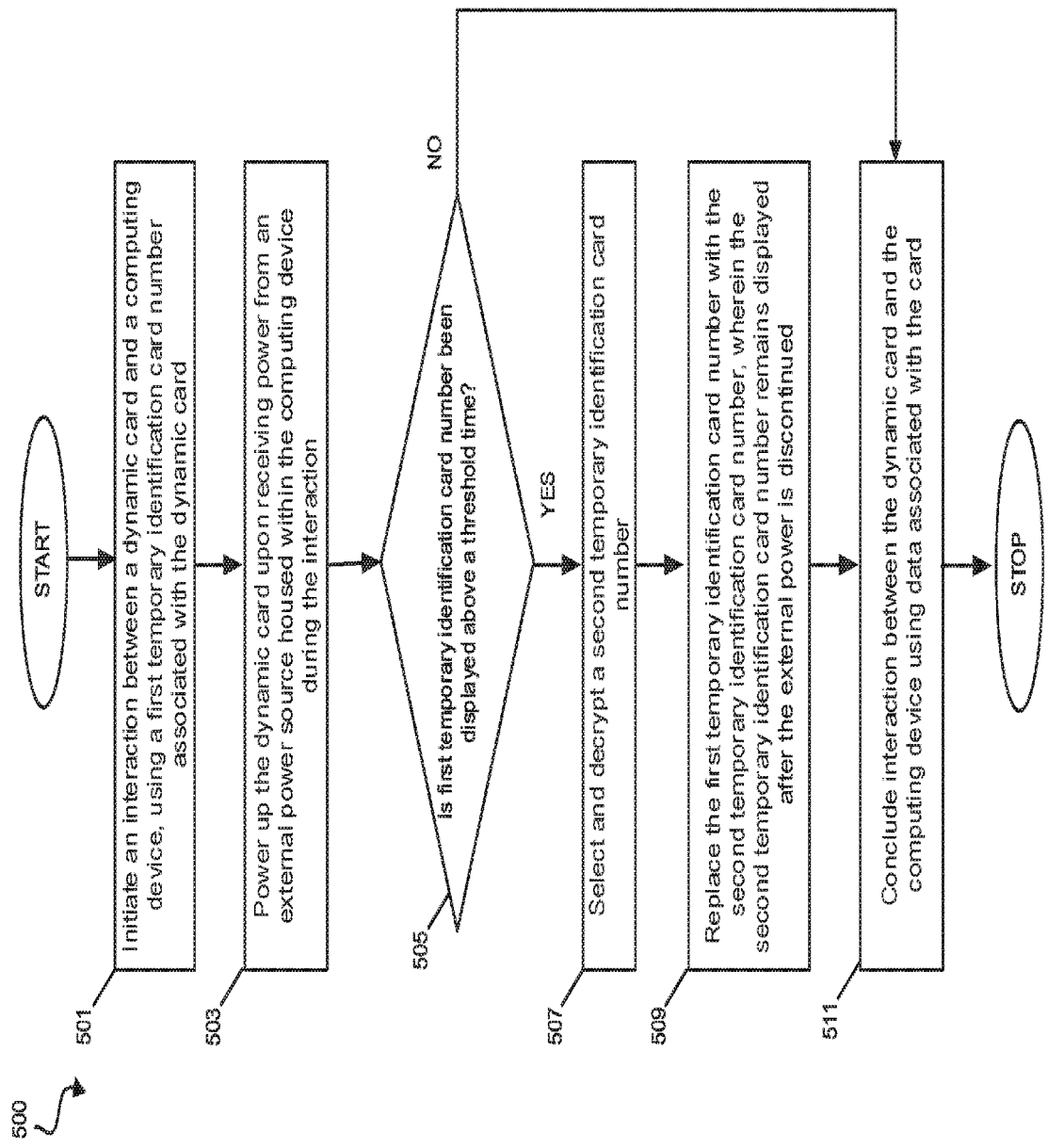

FIG. 5 is a flowchart illustrating examples of computations executed by the dynamic card, in accordance with one or more embodiments of the present disclosure. In some instances, the dynamic card 100 can initiate an interaction with a computing device using a first temporary card identification number associated with the dynamic card as shown at 501. Such an interaction can be, for example, a contactless interaction, an insertion of the card into the computing device or other suitable type of interaction. In some instances, as shown at 503, the dynamic card 100 can power up with power received from the computing device during the interaction, for example, in a contactless interaction, the card can receive RFID signals or electromagnetic waves from the computing device that can power up the dynamic card 100.

In some embodiments, the dynamic card 100 can determine if a first temporary card identification number has been displayed on the dynamic card above a threshold time as shown in the conditional statement 505. In some instances, such a determination can be made based on a timestamp associated with the first temporary card identification number. In some instances when the first temporary card identification number has not been displayed above the predetermined threshold time, the dynamic card 100 concludes the interaction with the computing device using data associated with the dynamic card 100 as shown at 511. Such data can include, for example, a permanent card identification number, a user name, an expiration date, a temporary card identification number or other suitable data associated with the dynamic card 100.

In some embodiments, when the dynamic card 100 determines that the first temporary card has been displayed on the card above a predetermined threshold time as shown in conditional statement 505 the flow proceeds to 509. At 509 the dynamic card identifier system 100 can select and decrypt a second temporary card identification number. The second temporary card identification number can remain displayed after the external power is discontinued. Thereafter, the flow proceeds to 511 as discussed above. It is noted that in some instances, the data associated with the dynamic card 100 can include the first temporary card identification number or the second temporary card identification number depending on the outcome of the conditional statement 505 discussed above.

Figure 6:
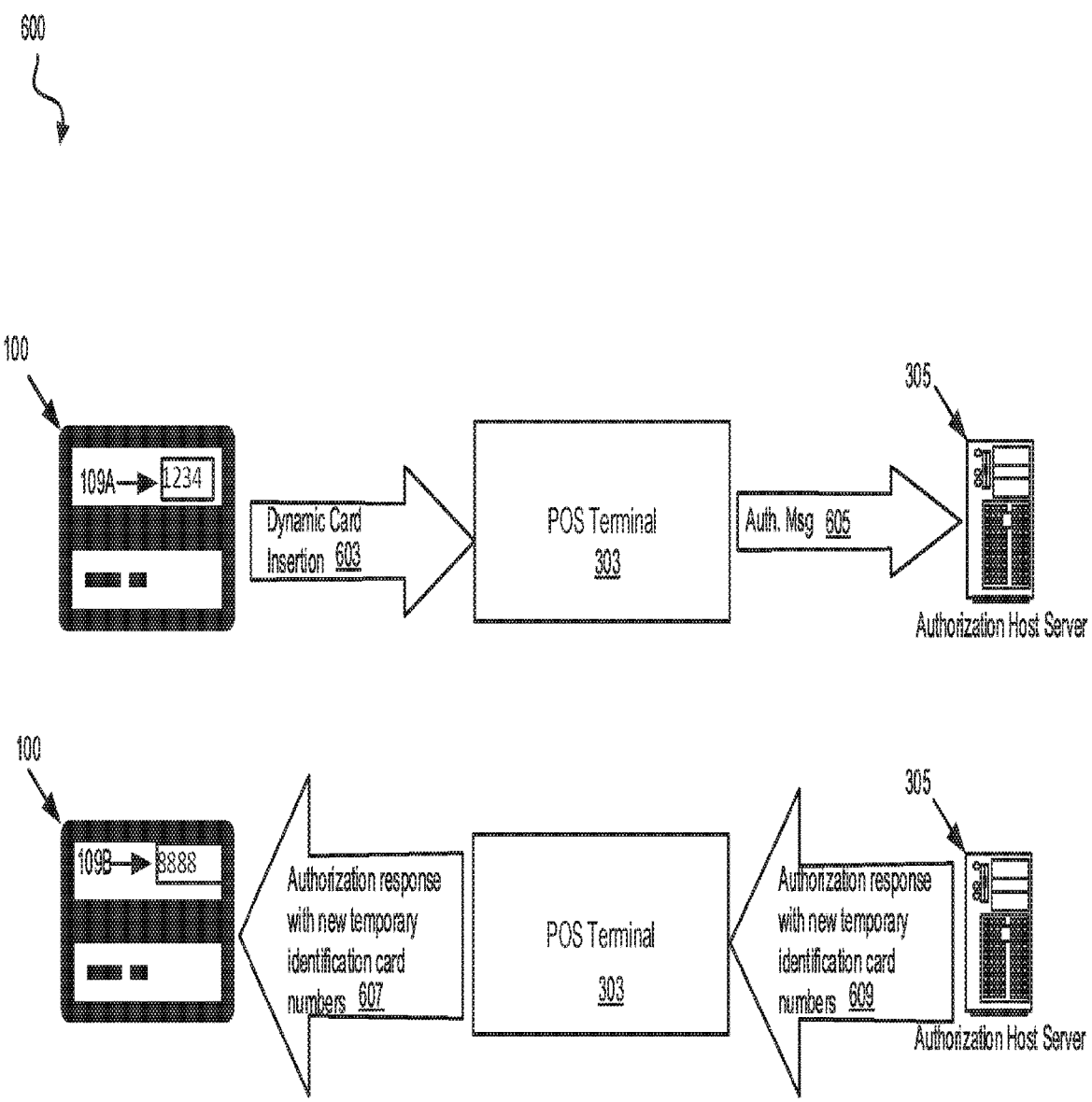

FIG. 6 are examples of interactions between the dynamic card 100 and a computing device, in accordance with one or more embodiments of the present disclosure. In some instances, the dynamic card 100 can be associated with a first temporary card identification number 109A. The dynamic card 100 can be inserted into a computing device, for example, POS terminal 303. The POS terminal 303 can send an authorization message 605 to the authorization host server 305. In some instances, the authorization host server 305 can send an authorization response 609 with a set of new encrypted card identification numbers. The dynamic card 100 can receive the authorization response 607 with the set of new encrypted card identification numbers. Thereafter, the dynamic card 100 can select and decrypt an encrypted card identification number from the set of new encrypted card identification numbers to produce a second temporary card identification number. The second temporary card identification number 109B can be shown on the dynamic card 100 and used in a subsequent interaction with a different computing device.

Figure 7:
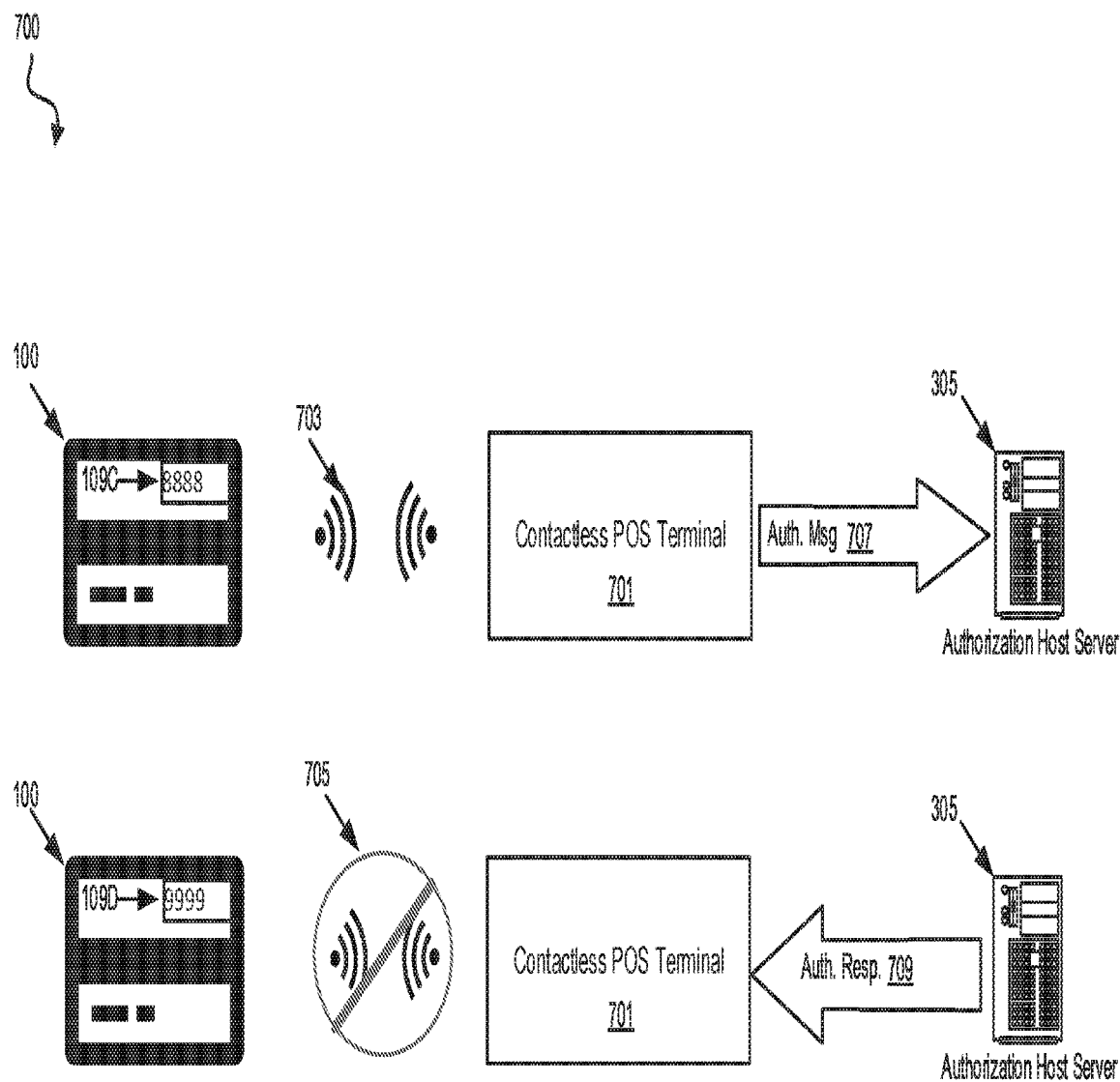

FIG. 7 is an example of a contactless interaction between the dynamic card and a computing device, in accordance with one or more embodiments of the present disclosure. In some instances, the dynamic card 100 can be placed near a computing device, for example, contactless POS terminal 701. The contactless POS terminal 701 can emit electromagnetic waves or RFID signals 703 received by the dynamic card 100. The dynamic card 100 can use the electromagnetic waves to power up and send data to the contactless POS terminal 701. As discussed above, examples of such data can include a permanent card identification number, a first temporary card identification number 109C, a user name, an expiration date, and/or other suitable data associated with the dynamic card 100. The contactless POS terminal 701 can use such data to send an authorization message 707 to the authorization host server 305.

In some embodiments, the dynamic card 100 can be powered up by the electromagnetic waves 703. The dynamic card 100 can retrieve from memory and decrypt an encrypted card identification number to produce a second temporary card identification number 109D while the dynamic card 100 is powered up by the electromagnetic waves 703. Additionally, the dynamic card 100 can show the second temporary card identification number 109D on the display also while the dynamic card 100 is powered up by the electromagnetic waves 703. In some instances, the contactless POS terminal 701 can receive an authorization response 709 from the authorization server 305 approving the contactless interaction. It is noted that the second temporary card identification number 109D can remain shown on the display after the electromagnetic waves 703 are discontinued.

Figure 8:
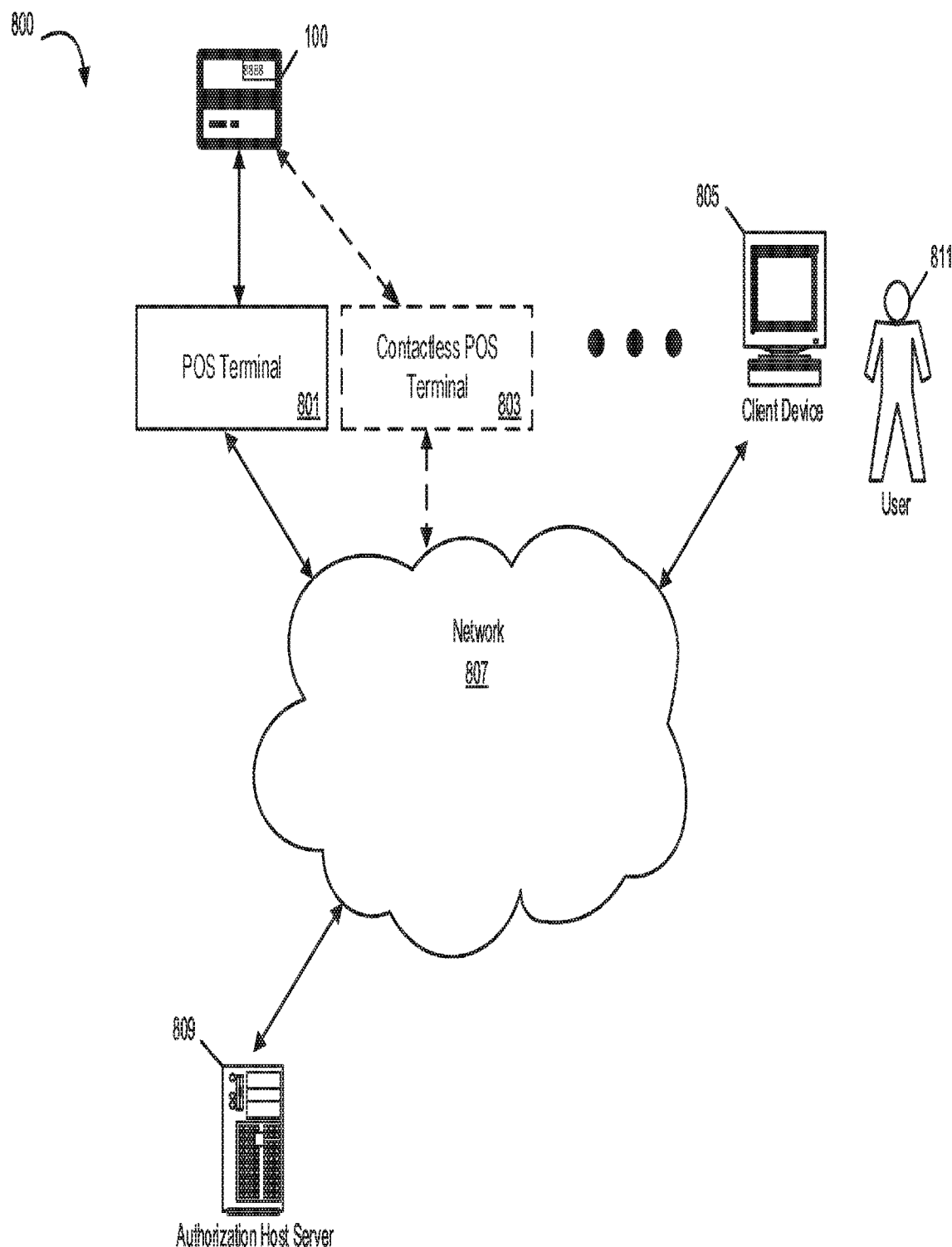

FIG. 8 depicts a block diagram of an example of a computer-based system 800, in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the computing devices and/or the computing components of the computer-based system 800 may be configured to manage large numbers of members and/or concurrent transactions or electronic activities, as detailed herein. In some embodiments, the computer-based system 800 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 8, members POS terminal 801, contactless POS terminal 803, and client device 805 (e.g., clients) of the computer-based system 800 may include virtually any computing device capable of receiving and sending a message over a network (e.g., cloud network), such as network 807, to and from another computing device, such as server 809, and the like. In some embodiments, the dynamic card 100 can interact with the POS terminal 801 and the contactless POS terminal 803 as discussed above. In some instances, a user 811 in communication with client device 805 can use the dynamic card 100 to execute e-commerce transactions using data associated and/or stored in the dynamic card 100. In some embodiments, server 809 can be part of a financial institution system, merchant system, online store system, or other suitable entity capable of authenticate and authorize interactions or transactions associated with the dynamic card 100. In some embodiments, the member devices 801, 803, and 805 may be personal computers, multiprocessor systems, microprocessor-based or programmable consumer electronics, network PCs, and the like. In some embodiments, one or more member devices within member devices 801, 803, and 805 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 801, 803, and 805 may be devices that are capable of connecting using a wired or wireless communication medium such as, wearable computer, a laptop, tablet, desktop computer, a netbook, a video game device, a pager, a smart phone, an ultra-mobile personal computer (UMPC), and/or any other device that is equipped to communicate over a wired and/or wireless communication medium. In some embodiments, one or more member devices within member devices 801, 803, and 805 may run one or more applications, such as Internet browsers, mobile applications, voice calls, video games, videoconferencing, and email, among others. In some embodiments, one or more member devices within member devices 801, 803, and 805 may be configured to receive and to send web pages, and the like. In some embodiments, a browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 801, 803, and 805 may be specifically programmed by either Java, .Net, QT, C, C++ and/or other suitable programming language. In some embodiments, one or more member devices within member devices 801, 803, and 805 may be specifically programmed to include or execute an application to perform a variety of possible tasks, such as, without limitation, messaging functionality, browsing, searching, playing, streaming or displaying various forms of content, including locally stored or uploaded messages, images and/or video.

In some embodiments, the network 807 may provide network access, data transport and/or other services to any computing device coupled to it. In some embodiments, the network 807 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the network 807 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the network 807 may include and implement, as an alternative or in conjunction with one or more of the above, a WiMAX architecture defined by the WiMAX forum. In some embodiments and, optionally, in combination of any embodiment described above or below, the network 807 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the network 807 may be transmitted based at least in part on one or more communication modes such as but not limited to: Near-Field Communication (NFC), Radio Frequency Identification (RFID), Narrow Band Internet of Things (NBIOT), ZigBee, 3G, 4G, 5G, Global System for Mobile Communications (GSM), General Packet Radio Service (GPRS), WiFi, WiMax, Code Division Multi-access (CDMA), and any combination thereof. In some embodiments, the network 1007 may also include mass storage, such as Network Attached Storage (NAS), a Storage Area Network (SAN), a Content Delivery Network (CDN) or other forms of computer or machine-readable media.

In some embodiments, the server 809 may be, for example, a web server (or a series of servers) running a network operating system. In some embodiments, the server 809 may be used for and/or provide cloud and/or network computing. Although not shown in FIG. 8, in some embodiments, the server 809 may have connections to external systems like email, SMS messaging, text messaging, ad content providers, etc.

In some embodiments, the server 809 may be specifically programmed to perform, in non-limiting example, as authentication servers, search servers, email servers, social networking services servers, financial/banking-related services servers, travel services servers, or any similarly suitable service-base servers for users of the member computing devices 801, 803, and 805.

In some embodiments and, optionally, in combination of any embodiment described above or below, for example, one or more computing member devices 801, 803, and 805, the server 809, may include a specifically programmed software module that may be configured to send, process, and receive information using a scripting language, a remote procedure call, an email, a tweet, Short Message Service (SMS), Multimedia Message Service (MMS), Instant Messaging (IM), Internet Relay Chat (IRC), mIRC, Jabber, an application programming interface, Simple Object Access Protocol (SOAP) methods, Common Object Request Broker Architecture (CORBA), Hypertext Transfer Protocol (HTTP), Representational State Transfer (REST), or any combination thereof.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" or "near real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process. In some embodiments, events and/or actions in accordance with the present disclosure can be in real-time, near real-time, and/or based on a predetermined periodicity of at least one of: nanosecond, several nanoseconds, millisecond, several milliseconds, second, several seconds, minute, several minutes, hourly, several hours, daily, several days, weekly, monthly, etc. As used herein, the term "dynamically" and term "automatically," and their logical and/or linguistic relatives and/or derivatives, mean that certain events and/or actions can be triggered and/or occur without any human intervention.

In some embodiments, programmed computing systems with associated devices can be configured to operate in the distributed network environment, communicating with one another over one or more suitable data communication networks (e.g., the Internet) and utilizing one or more suitable data communication protocols.

In some embodiments, the material disclosed herein may be implemented in hardware and software or firmware or a combination of them or as instructions stored on a non-transitory machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices, and others. In some embodiments, the non-transitory machine-readable medium can include one or more storage devices, and memory devices described above.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or Central Processing Unit (CPU). In various implementations, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

In some embodiments, one or more of computer-based systems of the present disclosure may include or be incorporated, partially or entirely into at least one Personal Computer (PC), laptop computer, tablet, portable computer, smart device (e.g., smart phone, smart tablet or smart television), Mobile Internet Device (MID), messaging device, data communication device, server computer, and so forth.

In some embodiments, computer-based systems of the present disclosure may be configured to utilize hardwired circuitry and/or hardware components that may be used in place of or in combination with software instructions to implement features consistent with principles of the disclosure. Thus, implementations consistent with principles of the disclosure are not limited to any specific combination of hardware circuitry or hardware components and/or software In some embodiments, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

In some embodiments, computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user.

The aforementioned examples are, of course, illustrative and not restrictive.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the methodologies, the systems, and the devices described herein can be utilized in any combination with each other. Further still, the various steps may be carried out in any desired order (and any desired steps may be added and/or any desired steps may be eliminated).

What is claimed is:

1. A dynamic card, comprising:
   a bus configured to receive a power;
   a display coupled to the bus;
   a processor configured to control the display;
   a non-transitory memory storing instructions executable by the processor to perform operations comprising:
   transmitting a first temporary card identification number associated with the dynamic card to a first external computing device;
   receiving a set of encrypted card identification numbers from a server in communication with the first external computing device;
   decrypting a second temporary card identification number selected from the set of encrypted card identification numbers; and
   replacing the first temporary card identification number shown on the display with the second temporary card identification number, wherein
   the bus receives the power from a first external power source in the first external computing device, and
   the second temporary card identification number remains shown on the display when the power is discontinued to the dynamic card.

2. The dynamic card of claim 1, wherein the processor is configured to receive the set of encrypted card identification numbers from the server when a condition is met.

3. The dynamic card of claim 2, wherein the condition is met when the processor determines that each encrypted card identification number in the set of encrypted card identification numbers stored in the non-transitory memory have been transmitted to the first external computing device.

4. The dynamic card of claim 2, wherein the condition is met when the processor determines that the first temporary card identification number is shown on the display beyond a predetermined time period.

5. The dynamic card of claim 1, wherein each encrypted card identification number in the set of encrypted card identification numbers is preapproved by the server.

6. The dynamic card of claim 1, wherein the instructions when executed by the processor further cause the processor to perform operations comprising:
transmitting the second temporary card identification number to a second external computing device, wherein
the bus receives the power from at least one of the first external power source in the first external computing device or a second external power source in the second external computing device, and
the second temporary card identification number is transmitted while the power is discontinued to the dynamic card.

7. The dynamic card of claim 6, wherein the second temporary card identification number is validated by the server.

8. The dynamic card of claim 6, wherein the instructions when executed by the processor further cause the processor to perform operations comprising:
timestamping the second temporary card identification number with a replacement time of replacing the first temporary card identification number with the second temporary card identification number.

9. The dynamic card of claim 8, wherein the instructions when executed by the processor further cause the processor to perform operations comprising:
replacing the second temporary card identification number with a third temporary card identification number selected from the set of encrypted card identification numbers upon a determination that the second temporary card identification number is shown on the display beyond a predetermined time period calculated from the replacement time of the second temporary card identification number.

10. The dynamic card of claim 9, wherein the instructions when executed by the processor further cause the processor to perform operations comprising:
transmitting the third temporary card identification number to a third external computing device, wherein
the bus receives the power from at least one of the first external power source in the first external computing device, the second external power source in the second external computing device, or a third external power source in the third external computing device, and
the power is received during a contactless interaction between the dynamic card and at least one of the first external power source, the second external power source, or the third external power source.

11. The dynamic card of claim 1, wherein the display is an electrophoretic display.

12. A method, comprising:
powering a dynamic card with a power;
transmitting a first temporary card identification number associated with the dynamic card to a first external computing device;
receiving a set of encrypted card identification numbers from a server in communication with the first external computing device;
decrypting a second temporary card identification number selected from the set of encrypted card identification numbers; and
replacing the first temporary card identification number shown on a display with the second temporary card identification number, wherein
the power for powering the dynamic card is received from a first external power source in the first external computing device, and
the second temporary card identification number remains shown on the display when the power is discontinued to the dynamic card.

13. The method of claim 12, wherein the set of encrypted card identification numbers is received from the server when a condition is met.

14. The method of claim 13, wherein the condition is met when each encrypted card identification number in the set of encrypted card identification numbers have been transmitted to the first external computing device.

15. The method of claim 13, wherein the condition is met when the first temporary card identification number is shown on the display beyond a predetermined time period.

16. The method of claim 12, further comprising:
transmitting the second temporary card identification number to a second external computing device, wherein
the power is received from at least one of the first external power source in the first external computing device or a second external power source in the second external computing device, and
the second temporary card identification number is transmitted while the power is discontinued to the dynamic card.

17. The method of claim 16, wherein the second temporary card identification number is validated by the server.

18. The method of claim 16, further comprising:
timestamping the second temporary card identification number with a replacement time of replacing the first temporary card identification number with the second temporary card identification number.

19. The method of claim 18, further comprising:
replacing the second temporary card identification number with a third temporary card identification number selected from the set of encrypted card identification numbers upon determining that the second temporary card identification number is shown on the display beyond a predetermined time period calculated from the replacement time of the second temporary card identification number.

20. The method of claim 19, further comprising:
transmitting the third temporary card identification number to a third external computing device, wherein
the power is received from at least one of the first external power source in the first external computing device, the second external power source in the second external computing device, or a third external power source in the third external computing device, and
the power is received during a contactless interaction between the dynamic card and at least one of the first external power source, the second external power source, or the third external power source.

* * * * *